United States Patent [19]

Embra

[11] Patent Number: 4,621,785
[45] Date of Patent: Nov. 11, 1986

[54] CAMERA MOUNT

[75] Inventor: Maurice C. Embra, Vancouver, Canada

[73] Assignee: Embra Productions Ltd., Vancouver, Canada

[21] Appl. No.: 674,280

[22] Filed: Nov. 23, 1984

[51] Int. Cl.$^4$ ............................................. F16M 13/00
[52] U.S. Cl. .................................. 248/565; 248/183; 352/243; 354/74
[58] Field of Search ............... 248/565, 560, 651, 662, 248/176, 183, 188.5, 179; 354/74, 76, 293; 352/243

[56] References Cited

U.S. PATENT DOCUMENTS

| | | | |
|---|---|---|---|
| 2,211,825 | 8/1940 | Kindelmann et al. | 248/662 |
| 2,219,169 | 10/1940 | Alter | 248/1 |
| 2,506,095 | 5/1950 | Mantz | 354/74 |
| 3,044,346 | 7/1962 | Fieux | 248/651 X |
| 3,682,424 | 8/1972 | Strumpell | 248/565 |
| 4,158,489 | 6/1979 | Gottschalk et al. | 352/243 |
| 4,249,817 | 2/1981 | Blau | 248/183 X |
| 4,474,439 | 10/1984 | Brown | 354/293 X |

FOREIGN PATENT DOCUMENTS 0047907 7/1979 Fed. Rep. of Germany ...... 248/565

Primary Examiner—Ramon O. Ramirez

[57] ABSTRACT

A vibration damping mount has a frame and at least one and preferably, two parallel guides extending therefrom. A support tube extends in the same direction as the guides, and preferably parallel to it, and carries a platform such as a camera platform, on its upper end. A bracket connects the support tube and guides such that the support tube and attached platform can slide in relation to the guides, while being prevented from moving laterally, in particular prevented from rotating, with respect thereto. Resilient means is connected between the support tube and frame so as to inhibit downward movement of the support tube and attached platform, thereby absorbing vertical vibration. A piston arrangement is also further preferably included for reducing larger vibrations. As well, a telescoping foot shaft arrangement and a pan handle arrangement are further provided.

23 Claims, 10 Drawing Figures

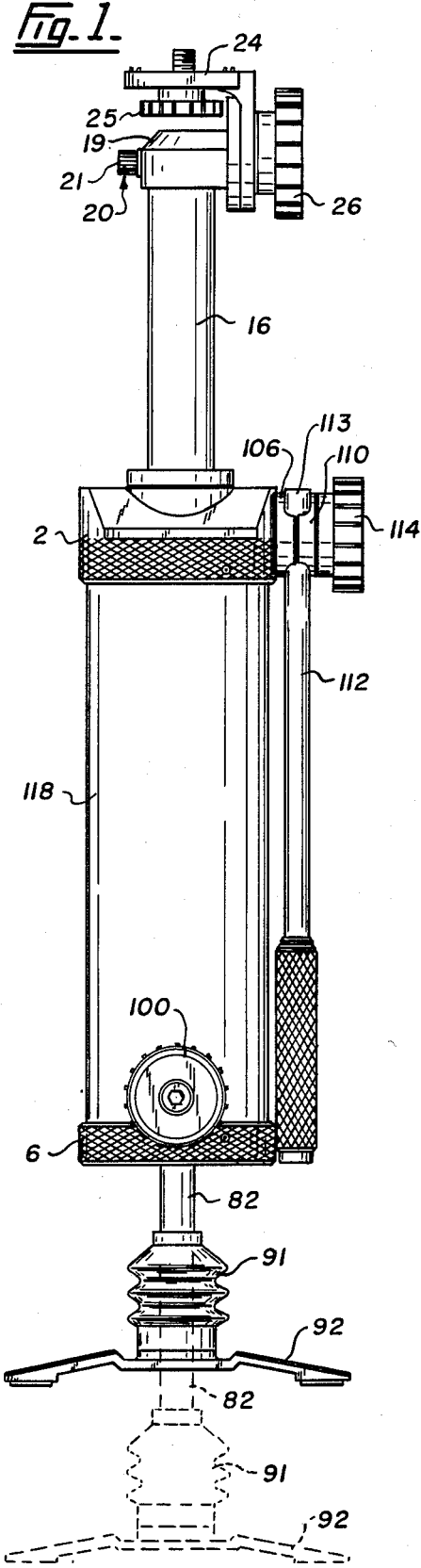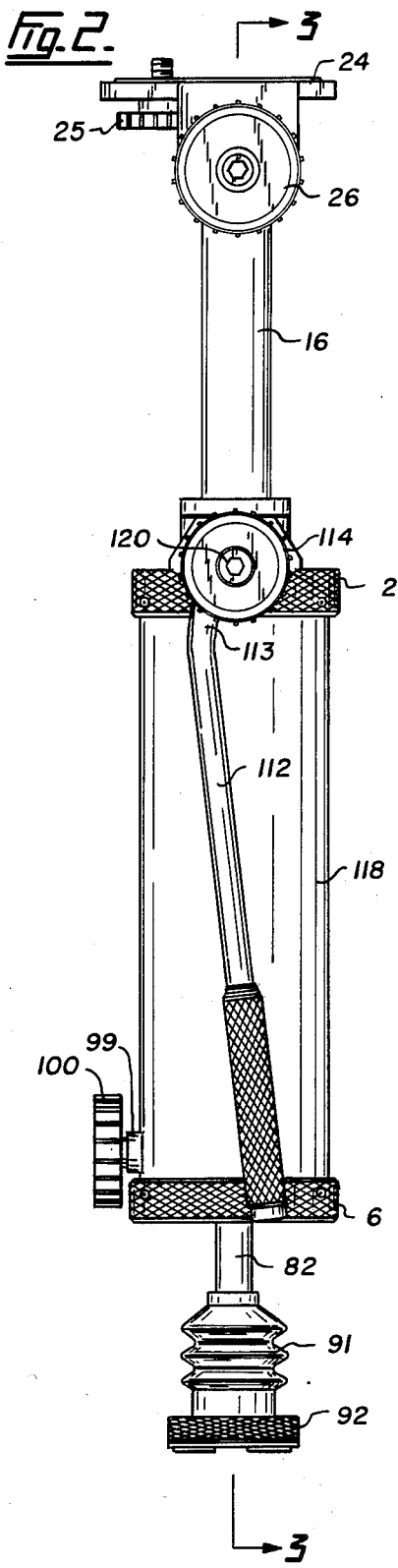

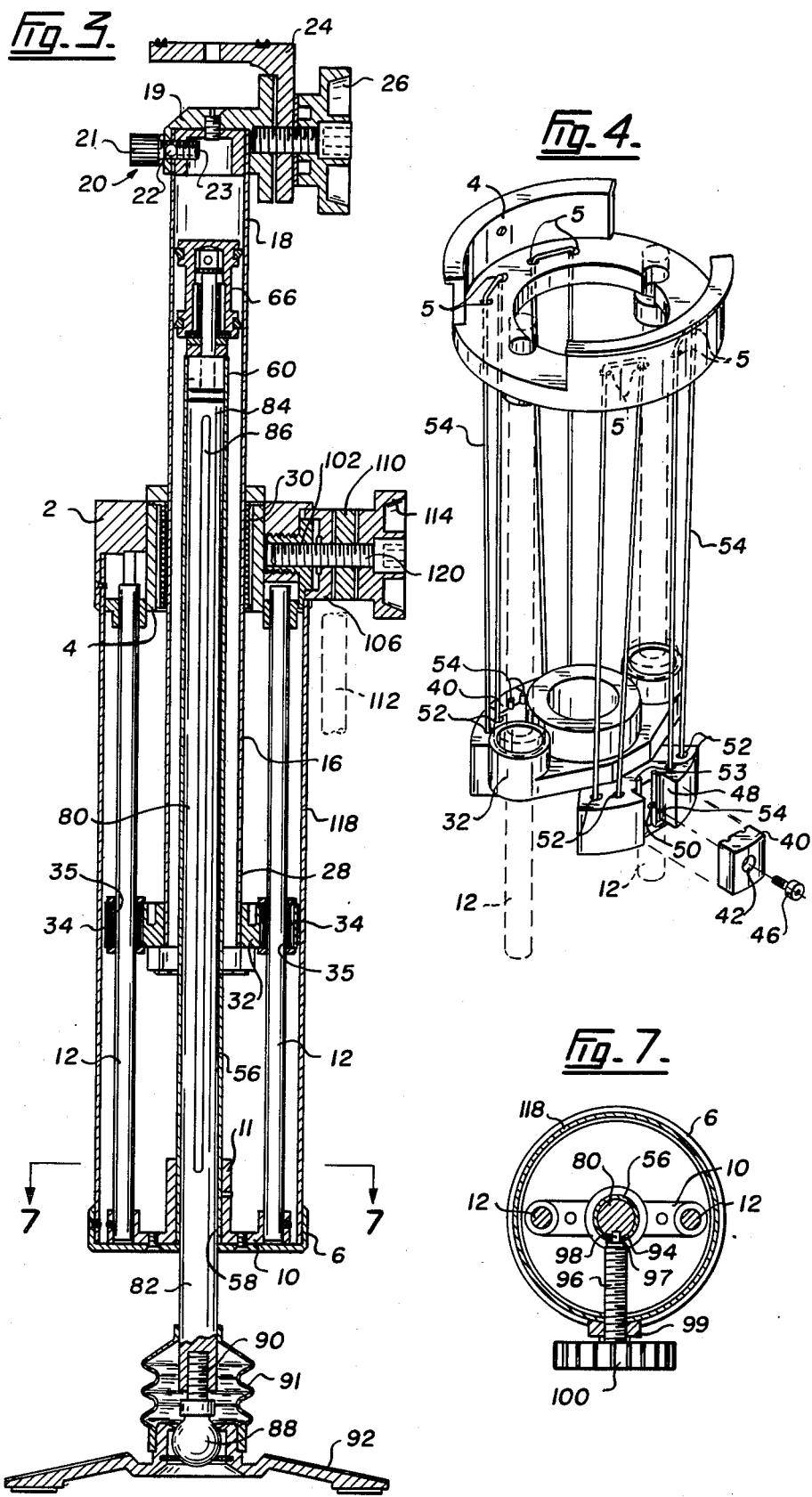

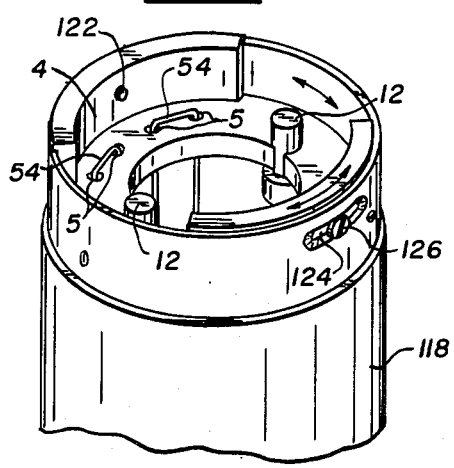
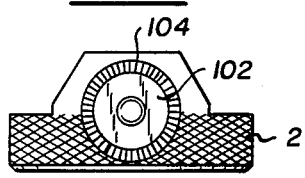
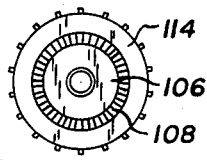
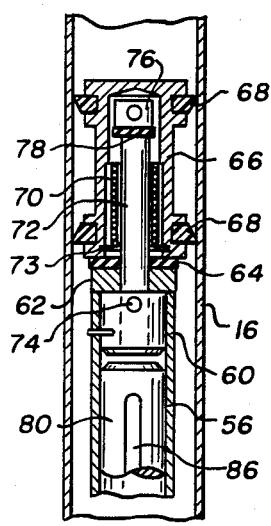
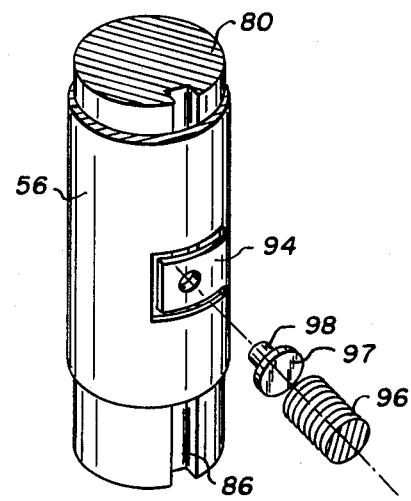

CAMERA MOUNT

FIELD OF THE INVENTION

This invention relates to a mount particularly intended for use with cameras in locations where vibration is a problem, for example in helicopters.

DESCRIPTION OF PRIOR ART

It is often desirable to shoot film or tape from locations in which vibration is a problem, in particular from a helicopter. The vibration of course, becomes increasingly noticeable on the film or tape, when telephoto lenses of increasing power are utilized. This problem has been recognized for some time. For example, U.S. Pat. No. 2,506,095 to Mantz discloses a relatively complex camera mount particularly intended for use in helicopters. The device of the foregoing patent, attempts to minimize vibration transferred between the helicopter or other vehicle, and the camera platform, by use of vibration damping units connected between the camera platform and the frame of the device (which frame is fixedly connected to the helicopter or other vehicle), including at least one such device disposed orthogonally to the others. Each of the foregoing plurality of vibration damping devices, is a rotary active device, consisting of an arrangement such that upon turning of the shaft thereof relative to the housing, a fluid is forced through a needle valve from a first chamber decreasing in volume, to a second chamber increasing in volume by an amount equal to the decrease in volume of the first chamber. Each of such damping devices alone then, does not produce a damping action except upon relative rotational movement of the housing and shaft thereof.

Another attempt to minimize vibration between a vehicle such as a helicopter, and the camera platform, is disclosed in U.S. Pat. No. 3,044,346 to Fieux. The foregoing device appears to basically provide a relatively large sized apparatus, including cameraman's seat, which is entirely spring mounted upon a normally upright standard. In addition, a servo-control mechanism is provided for simultaneous movement of the camera and cameraman's seat. Other attempts have also been made to produce a stable image in a camera used on a vehicle such as a helicopter, as for example the use of a gyroscope stabilized mirror through which the image is reflected prior to entering the camera.

Further devices in the area of camera mounts include U.S. Pat. No. 2,709,560 to Resk, which discloses a camera tripod mount, for use apparently on the ground and not on a vehicle. The foregoing device includes a spring loaded telescoping column supporting the camera platform, to assist in raising or lowering such platform when in use. A wire or cord limits the maximum telescoping movement. U.S. Pat. No. 2,219,169 to Alter discloses an adjustable camera mount which has a telescoping column mounted at its opposite ends by means of ball joints, to a base and a top end rest. Such mount is for use in automobiles such that the height thereof can be adjusted so that the base rests on the floor of such device with the top end rest pressed against the roof of the automobile. This is accomplished simply by adjusting a bolt to move two sections of the central tube axially away from one another. Apparently no attempt is made to reduce vibration between the vehicle and the camera platform, except for the fact that a rigid mounting of the camera in relation to the vehicle is provided when the device is in use.

SUMMARY OF THE INVENTION

The present invention provides a mount upon which a camera may be mounted, and is particularly useful in vehicles such as helicopters, in order to reduce vibration between the vehicle and the camera platform. The mount comprises a frame having at least one elongated guide extending therefrom. A support tube extends in the same direction as the guide, with a platform such as a camera platform, being attached to an upper end of the support tube. A bracket connects an end of the support tube to the guide member such that the support tube and attached platform can slide in relation to the guide while being prevented from moving laterally with respect thereto. In particular, rorational movement of the support tube and attached platform in relation to the guide, is prevented. Resilient means, such as elongated rubber springs, is connected between the support tube and the frame, so as to inhibit downward movement of the support tube and attached platform. At least two spaced guides as described, are provided, which members extend in the same direction and in the same direction as the support tube. In addition, the platform is preferably attached to an upper end of the support tube. The foregoing guides are conveniently made parallel and extend between an upper and a lower end of the frame. In such case, the support tube has a lower end which is fixedly connected to the bracket, which bracket has two mounts slidably engaging respective guides while preventing rotation of the bracket. Such mounts are conveniently linear bearings.

The support tube is further preferably parallel with the guides, and slidably extends through the upper end of the frame so as to be transversely supported by such upper end.

The mount usefully additionally comprises a piston rod and a piston and mating cylinder combination, the piston of which is connected to the piston rod, and the cylinder being provided with a valve opening therein. The piston rod and the cylinder is connected between the frame and support tube such that upward or downward movement of the support tube is inhibited further by relative movement of the cylinder with respect to the piston. Preferably, it is the cylinder which is connected to the support tube with the piston rod connected to the frame. Such an arrangement facilitates disposition of the remainder of the tubes and piston rod in a relatively compact arrangement. Additionally, the piston is usefully connected to the piston rod in such a manner as to be slidable along an end of it a limited distance so as to provide substantial resistance to movement of the support tube only when the piston is at an upper or a lower limit position.

There is also preferably provided a foot shaft which can telescope into the piston rod, in combination with a means for retaining the foot shaft in an extended or retracted position.

As previously mentioned, the resilient means preferably comprises resilient bands such as rubber springs. In addition though, there is also preferably provided clamping blocks disposed in such a manner such that they are firmly pinching respective resilient bands before the ends thereof, so as to retain the resilient bands in position. That is, the resilient bands are pinched a distance slightly spaced from both the ends of each resilient band.

Preferably, an arrangement is also provided which permits adjustment of the guides parallel with the support tube. In this arrangement, the upper end of the frame has a upper bracket to which an upper end of the guides are attached. This upper bracket is rotatable about the support tube so as to adjust the guides parallel with it. In such case, the mount is additionally provided with retaining means for releasably retaining the upper bracket in any of a plurality of angular spaced positions. The foregoing retaining means may usefully comprise a housing having a transversely extending slot in the upper end of it, and a corresponding bolt passing through the slot.

A further aspect of the invention includes a serated disk arrangement to which a pan handle is attached, so that the pan handle can be swung in a vertical plane and fixed in any one of a plurality of positions therein, when a tensioning means is tightened against one of the disks.

DRAWINGS

Embodiments of the invention will now be described with reference to the drawings in which:

FIG. 1 is a side view of a mount of the present invention;

FIG. 2 is a further side view of the mount of FIG. 1, as viewed from a position 90° to the view in FIG. 1;

FIG. 3 is a vertical cross section of the mount taken along the line 3—3 of FIG. 2;

FIG. 4 is a perspective, partially exploded view of a portion of the internal mechanism of the mount of the foregoing figures;

FIG. 5 is a perspective view of an upper portion of the mount of the foregoing Figures;

FIG. 6 is a perspective view of a retaining means for a foot shaft of the mount of the foregoing Figures;

FIG. 7 is a cross section along the line 7—7 of FIG. 3;

FIG. 8 is a face view of a first serrated disc as used on the upper end of the mount of the foregoing figures;

FIG. 9 is a face view of a second disc thereof; and

FIG. 10 is an enlarged view of a portion of the cross section of FIG. 3.

DETAILED DESCRIPTION OF EMBODIMENT OF THE INVENTION

In referring to the Figures, it should first be noted that terms such as "upper", "lower", and the like, are used in a relative rather absolute sense, with particular reference to the mount in its normal operating position. The mount as shown consists of a frame, having a generally circular upper end 2, including an upper block 4 which is rotatable as will be desribed, and a generally circular lower end 6, including a lower block 10 attached thereto. A housing 118 is provided, which extends between upper end 2 and lower end 6, and is fastened thereto by means of screws. The mount further includes two transversely spaced, parallel, elongated guides 12 in the form of circular rods, extending between upper end 2 and lower end 6. Specifically, upper and lower ends of guides 12 are received in mating receptacles in blocks 4 and 10 respectively, and retained therein by means of set screws or the like. A hollow, cylindrical support tube 16, extends parallel to guides 12 and further slideably extends through the upper end 2 of the frame by virtue of an opening therein, as well as by virtue of linear bearing 30 fixed in position therein. Support tube 16 has an upper end 18 which has a valve 20 defined by valve screw 21 threadedly engaged in a mating opening in upper end 18 of support tube 16. Valve screw 21 has an opening 22 therein communicating with lengthwise extending passage 23, which in turn communicates with the interior of upper end 18. As will be evident, turning of valve screw 21 inward or outward, will decrease or increase, respectively, the rate at which air which can ingress or egress through valve 20, and into or out of upper end 18 of support tube 16.

A mounting block 19 is attached to upper end 18, to which block 19 is attached a camera platform 24 of well known construction. Knob 26 allows platform 24 to be releasably retained on block 19. Support tube 16 also has a lower end 28 fixedly attached to a bracket 32, which in turn has two mounts 34 slideably engaged upon respective guides 12 through linear bearings 35 retained in mounts 34. It will be seen then, by virtue of the foregoing arrangement that bracket 32 thereby connects support tube 16 to guides 12, such that support tube 16 and attached platform 24 can slide in relation to guides 12, while being prevented from moving laterally with respect to guides 12. In particular, support tube 16 and platform 24 are unable to rotate with respect to guides 12.

Referring in particular now to FIG. 4, it will be seen that bracket 32 includes two clamping blocks 40, disposed on opposite sides thereof. In addition, each side of bracket 32 has a total of four circular openings 52 extending therethrough, as well as two basically semi-circular channels 53 extending through respective two opposed recessed portions 48 of bracket 32. Recessed portions 48 are dimensioned to receive and mate with respective clamping blocks 40. An opening 50 is provided in each recessed portion 48, which is threaded to receive a mating screw 46 which can be passed through opening 42 in respective clamping blocks 40. The portions 48 and clamping blocks 40 are dimensioned such that tightening of screws 46 will retain the two clamping blocks 40 firmly within respective recessed portions 48, and adjacent the semi-circular channels 53 through which the two ends of respective ones of two rubber springs 54 (each of which acts as a resilient band) pass. As a result of the foregoing, with rubber springs 54 having their ends passed through the semi-circular channels 53, clamping blocks 40 will be firmly retained and compressed against rubber springs 54 so as to firmly pinch them before the ends thereof and retain them in position (that is pinch them at positions terminating short of their ends). It will be seen from FIG. 4 that each of the two rubber springs 54 are passed in a sinuous path extending from one of the channels 53, downwardly below bracket 32 and then upwardly through an adjacent opening 52 to upper block 4, through an opening 5 thereof, over block 4, and downwardly through an adjacent opening 5 thereof to again pass through an outer-most opening 52 of bracket 32. From there, the rubber spring 54 continues along the lower surface of bracket 32 to the opposed outermost opening 52 on the same side thereof, then back up through another opening 5 in upper block 4, again over upper block 4 and downwardly through an adjacent opening 5, downwardly through an inner opening 52 and under bracket 32, to then pass upwardly in an adjacent channel 53. Each of openings 52 and 5 are larger in diameter than the rubber springs, so that the rubber springs may be readily inserted therethrough, and are lengthwise slidable therethrough. Thus, rubber springs 54 are lengthwise slidable over upper block 4, and are only retained firmly in place as a result of having positions adjacent their ends pinched by respective clamping blocks 40. It will be noted that the two rubber springs 54 are together symmetrically disposed about support tube 16, to facilitate smooth operation of the device.

A mechanism is also provided by which the guides 12 can be adjusted parallel with support tube 16. As will be apparent in the later description of the operation of the mount, such parallelism is important to prevent jamming of the camera mount during its operation. The foregoing mechanism is most clearly seen in FIG. 5, and consists of allowing upper block 4 to be rotatable (at least within a limited angle) about support tube 16. In order to retain upper block 4 in a selected one of any of a plurality of angularly spaced positions, a retaining means is provided in the form of a transversely extending slot 124 in the upper end of the housing 118. A bolt 126 has its shank passing through the slot 124 and threadedly engaged in a mating threaded bore 122 in upper block 4. As a result, bolt 126 can be releasably tightened into bore 122, such that the head of bolt 126 presses against housing 118 adjacent slot 124 therein. When bolt 126 is of course tightened, upper block 4 cannot rotate with respect to support tube 16. On the other hand, when it is desired to adjust the positions of guides 12 with respect to support tube 16 to ensure their parallelism, bolt 126 can be slackened, and upper block 4 rotated to the required position.

A hollow piston rod 56 has a lower end 58 fixedly connected to lower end 6 of the frame, while an upper end 60 thereof carries a bushing 62 attached thereto, on top of which bushing is fixedly disposed a pad 64 of resilient material, such as rubber. This arrangement and the arrangement of the remainder of this paragraph, are best illustrated in FIG. 10. A piston 66, which includes seals 68 (preferably of a material such as neoprene), is connected to upper end 60 of piston rod 56 through a shaft 72 which has a lower end extending into bushing 62 and retained therein by means of screw 74. Shaft 72 extends into a hollow portion of piston 66, with piston 66 being slideably engaged thereon by virtue of linear bearing 70. A retaining clip 73 helps retain bearing 70 in position. By virtue of the foregoing arrangement, piston 66 is thereby slideably connected to the upper end 60 of piston rod 56. However, such slideable movement is only possible between the lower limit defined by piston 66 abutting pad 64, and an upper limit defined by a rubber pad 78 disposed on a bushing 76 carried within piston 66 on an upper end of shaft 72, contacting an upper end of linear bearing 70. It will be seen then that the upper end 18 of support rod 16 acts as the mating cylinder for piston 66, the two acting in combination such that upward or downward movement of platform 24 and corresponding movement of attached support tube 16, is inhibited by relative movement of the cylinder or upper end 18, with respect to piston 66 when piston 66 is at the upper or lower limit positions. This of course is due to the fact that air can only ingress or egress into the upper end 18 at a restricted rate in accordance with the setting of valve screw 21.

A solid foot shaft 80 is provided which is telescopically mounted within piston rod 56, specifically to telescope downward from lower end 58 of piston rod 56. Such telescoping action would be between a retracted position as shown in solid lines in FIGS. 1-3. and an extended position telescoped downwardly therefrom. A partially extended position is shown in broken lines in FIG. 1. In order to obtain compact size of the mount, while still allowing for relatively large telescoping movement of foot shaft 80, foot shaft 80 is dimensioned such that when in the retracted position, an upper end 84 thereof is just slightly below bushing 60.

An elongated slot 86 having closed ends, extends along most of the length of foot shaft 80. The lower end 82 of foot shaft 80 is connected by means of a threaded stud 90 through a ball and socket joint 88 to a base 92, which is dimensioned to accommodate the foot of a user on each side thereof. Joint 88 is covered by a protective rubber boot 91.

In order to retain foot shaft 80 in the retracted or fully extended position, or any position therebetween, a clamp is mounted on piston rod 56, which clamp consists of a resilient segment 94 cut therein so as to be moveable under force of a forward end 97 of threaded shaft 96 upon turning of a knob 100, between a position abutting the side of cylindrical foot shaft 80, and a position transversely spaced therefrom, corresponding to a clamped and released position, respectively, of the clamp. Thus, by turning knob 100 to move threaded stud 96 and front end 97 thereof (the foregoing together acting as a clamp positioner), resilient segment 94 can be released from the clamped position and foot shaft 80 telescoped between the retracted and extended positions, or any partially extended position therebetween. Foot shaft 80 can be held in any such position by simply turning knob 100 to tighten stud 96. The limits upon the telescoping action of foot shaft 80, are controlled as a result of key 98 on the forward end 97 of stud 96, normally extending through a hole in resilient segment 94, and into slot 86. Slot 86 again has closed upper and lower ends, and is of such a length such that when foot shaft 80 is in the retracted position, key 98 abuts the lower closed end of slot 86, while when in the extended position, key 98 abuts the closed upper end of slot 86. This latter feature is particularly important at least in relation to the extended position of foot shaft 80, since as the mount is normally in use in the position as shown in FIGS. 1-3, contact of key 98 with the closed upper end of slot 86, prevents downward movement of foot shaft 80 beyond the fully extended position upon slackening of bolt 96, and thereby prevents foot shaft 80 from possibly simply sliding out of piston rod 56. Of course if it is desired to disassemble the mount by removing foot shaft 80, knob 100 can be turned until key 98 becomes disengaged from slot 86 (i.e. removed from its normal position) and foot shaft 80 telescoped entirely out of piston rod 56.

The mount is also provided with a pan handle arrangement best shown in FIGS. 1-3. The foregoing arrangement includes a first serated disc 102 threadedly engaged in a mating receptacle in the upper end 2 of the frame. The serated face 104 of disc 102 is most clearly seen in FIG. 8. A second serated disc 106 is positioned adjacent the first serated disc 102, and in particular has a serated face 108 as shown most clearly in FIG. 9, positioned adjacent face 104 of disc 102, for releasable engagement therewith. Disc 106 is rotatably mounted on a threaded shaft 120, by virtue of having an unthreaded opening therethrough, through which passes shaft 120. Shaft 120 is received in a mating threaded bore in first disc 102 as shown most clearly in FIG. 3, and is connected at its opposite end to knob 114. Knob 114 and shaft 120 then, act as a tensioning means for releasably pressing second disc 106 against first disc 102, so that serated faces 108, 104, respectively, mesh upon turning of knob 114 to tighten shaft 120. Upon releasing such tensioning means by turning knob 114 such that shaft 120 turns to disengage from the threaded bore in first disc 102, second disc 106 will again be free to rotate on shaft 120. Furthermore, a third disc 110 also has an unthreaded bore therethrough such as to be rotatable upon shaft 120, so that both discs 106 and 110 are rotatable thereupon when shaft 120 is turned to the released position. This feature is useful since this allows swinging movement of a pan handle 112 in a vertical plane, pan handle 112 being attached to discs 106 and 110, by virtue of having an upper end 113 thereof, extending through respective aligned openings therein. Thus, it will be seen that by turning knob 114 to release shaft 120, pan handle 112 can then be swung to any of a plurality of desired positions in such vertical plane. Pan handle 112 can then be firmly retained in any such position, by turning knob 114 to again tighten shaft 120. This latter action again results in firm meshing of serated faces 104 and 108, of discs 102 and 106 respectively. Of course, if desired, knob 114 can be turned to release shaft 120 entirely from the threaded bore in disc 102, thereby totally disassembling the foregoing pan handle arrangement. In normal operation though, knob 114 would not be turned to such an extent.

It should be noted that pan handle 112 is retained in position by virtue of upper end 113 thereof, having an annular circumferential slot extending therearound at a position below the upper extremety thereof as viewed in FIGS. 1 and 2. By virtue of upper end 113 being positioned off axis of shaft 120 as shown most clearly in FIG. 2, this allows shaft 120 to pass tangentially through such annular slot, thereby preventing disengagement of upper end 113 from between discs 106 and 110, except again upon sufficient turning of knob 114 to release threaded shaft 120 from disc 102 to an extent greater than in normal operation of the mount. However, again this foregoing feature as will be seen, facilitates disassembly of the panning arrangement.

The majority of the foregoing device, is conveniently made of metal. In addition, it will be seen by virtue of the construction described, the mount is fairly readily assembled, and disassembled to facilitate manufacture and service of it when required. During assembly, it will be noted that guides 12 can be adjusted parallel with support shaft 16, in the manner previously described to ensure mounts 34 will not become jammed on guides 12 during use of the mount.

In use, a camera would be placed upon the upper end of platform 24 and retained thereon by knob 25 and attached threaded shaft in a manner well known. Foot shaft 80 would then be telescoped typically from the retracted position, in which it would be in when stored, to the desired extent, and retained in the extended or any partially extended position, all by turning knob 100 as already described. Pan handle 112 can then be swung in the vertical plane to any desired position by the operator, and retain therein, again the foregoing being allowed by turning of knob 114 as already described. Vibration will be reduced by virtue of the fact that guides 12, and the remainder of the frame, foot shaft 80, and base 92, can all move in sliding relation with respect to bracket 32 and support tube 16. Much of the force of movement will be absorbed by resilient members 54. Such members 54 are self-centering to ensure even absorption of such force, as a result of being lengthwise slidable over bracket 32 and upper block 4, except at their pinched ends. At the same rime, the vibration in the vertical direction as viewed in FIGS. 1–3, cannot be translated into rotational movement of support shaft 16 and platform 24, since by the structure already described, bracket 32, support shaft 16, and platform 24, are prevented from rotating with respect to guides 12 and the remainder of the frame, particularly again in view of the means by which mounts 34 are slideably engaged on guides 12. Some of the vertical vibrational movement will be absorbed by piston 66 and upper end 18 of support shaft 16 (such upper end again acting as a mating cylinder for piston 66) on only extreme vibrational movement as a result of "bumps", thereby allowing resilient members 54 to smoothly absorb most of the vertical vibration. This of course is because piston 66 can slide a restricted distance with respect to piston shaft 56, only between the upper and lower limit positions as already described.

In use, typically the piston 66 will tend to "float" between the upper and lower limit positions, and will only have effect in dampening vibrations, where they are equivalent to about half the length of travel of piston 66 with respect to shaft 72. The degree to which piston 66 has effect when it comes into play, can be controlled by turning of vent screw 21, to control the rate of ingress or egress of air into upper end 18 of support shaft 16, as already described.

It should be noted that many modifications are possible with regard to construction of the above mount. In particular, the number, type, and length of rubber springs 54 can be altered depending upon the typical camera weights which such amount might be used with. It has been found that with lighter duty cameras of about 12 to 20 pounds in weight, two rubber springs, each of a length sufficient such that it has only two sections extending between bracket 32 and upper block 4, can be used. On the other hand, with heavier duty cameras (about 30 pounds), two rubber springs of a length sufficient to each have four sections extending between bracket 32 and upper block 4 (the arrangement shown in the drawings), should preferably be used. It will also be apparent that the mount disclosed, is of a particularly compact arrangement, especially when the foot shaft 56 is in the retracted position.

As will be apparent to those skilled in the art in light of the foregoing disclosure, many further alterations and modifications are possible in the practice of this invention without departing from the spirit or scope thereof. Accordingly, the scope of the invention is to be construed in accordance with the substance defined by the following claims.

I claim:
1. A mount comprising:
  (a) a frame having two transversely spaced elongated guides positioned thereon, and extending in the same direction;
  (b) a support tube extending in the same direction as said guides;
  (c) a platform attached to an upper end of said support tube;
  (d) a bracket connecting an end of said support tube to said guides so that said support tube and attached platform, can slide in relation to the guides while being prevented from moving laterally with respect thereto;
  (e) resilient means connected between said support tube and said frame, for inhibiting downward movement of said support tube and attached platform;
  wherein said frame has an upper and a lower end, the guides are substantially parallel and extend there- between, said support tube has a lower end fixedly connected to said bracket, and wherein said bracket has two mounts which slideably engage respective guides while preventing rotation of said bracket.

2. A mount as described in claim 1 wherein said support tube is substantially parallel with the guides, and slideably extends through the upper end of said frame so as to be transversely supported thereby.

3. A mount as described in claim 2 wherein said resilient means is connected between the upper end of said frame and the lower end of said support tube.

4. A mount as described in claim 3 wherein said resilient means is directly connected to said bracket.

5. A mount as described in claim 1 additionally comprising:
   (a) a piston rod; and
   (b) a piston and mating cylinder combination, the piston being connected to said piston rod and the cylinder having a valve opening therein;
   one of said piston rod and said cylinder being connected to said support tube to move therewith, and the other one thereof being fixedly connected to said frame, so that upward or downward movement of said support tube can be inhibited by corresponding movement of said cylinder with respect to the piston.

6. A mount as described in claim 5 wherein said cylinder is connected to said support tube and said piston rod is connected to said frame, said support tube is hollow and serves as the cylinder, said piston rod is connected at its lower end to the lower end of said frame and extends upwardly within said support tube, and wherein the piston is connected to an upper end of said piston rod.

7. A mount as described in claim 6 wherein the piston is slideably connected to the upper end of said piston rod, so as to be slideable therealong a restricted distance between upper and lower limit positions, and provide in combination with the cylinder, a substantial resistance to upward or downward movement of said support tube only when said piston is at a corresponding limit position.

8. A mount as described in claim 5, additionally comprising:
   (a) a foot shaft telescopically mounted with respect to said piston rod so as to telescope from the lower end thereof between an extended and a retracted position;
   (b) retaining means for releasably retaining said foot shaft in each of the extended or retracted positions.

9. A mount as described in claim 8 wherein said piston rod is hollow and said foot shaft telescopes from within said piston rod.

10. A mount as described in claim 9 wherein said retaining means comprises:
    (a) an elongated slot with a closed upper end, extending along said foot shaft;
    (b) a clamp mounted on said piston rod and transversely moveable between a position abutting a side of said foot shaft corresponding to a clamped position of said clamp thereof, and a position transversely spaced therefrom corresponding to a released position of said clamp; and
    (c) a clamp positioner abutting said clamp so as to move said clamp between the clamped and released positions, said clamp positioner having a key normally engaged in the slot in said foot shaft so as to prevent downward movement thereof beyond the extended position.

11. A mount as described in claim 10 wherein said clamp comprises a resilient segment mounted on a side of said piston rod, which segment has a hole therethrough, wherein said clamp positioner comprises a bolt threadedly engaged in a mating bore in said housing so as to abut the resilient segment, and wherein the pin normally extends from a forward end of the bolt, through the hole therethrough, and into the slot in said foot shaft.

12. A mount as described in claim 4 wherein said resilient means comprises at least one resilient band having two ends, the band being symmetrically disposed about said support tube and extending from one of said bracket and the upper end of said frame and lengthwise slidable over the other one and back to said one, and wherein said one includes at least one clamping block, firmly pinching the resilient band before the ends thereof so as to retain the resilient band in position.

13. A mount as described in claim 12 wherein said resilient means comprises a plurality of resilient bands each as described, the bands being symmetrically disposed about said support tube, and wherein said bracket and the upper end of said frame include a plurality of clamping blocks, firmly pinching respective resilient bands before the ends thereof so as to retain the resilient bands in position.

14. A mount as described in claim 5 wherein said resilient means comprises at least one resilient band having two ends, the band being symmetrically disposed about said support tube and extending from one of said bracket and the upper end of said frame and lengthwise slidable over the other one and back to said one, and wherein said one includes at least one clamping block, firmly pinching the resilient band before the ends thereof so as to retain the resilient band in position.

15. A mount as described in claim 7 wherein said resilient means comprises at least one resilient band having two ends, the band being symmetrically disposed about said support tube and extending from one of said bracket and the upper end of said frame and lengthwise slidable over the other one and back to said one, and wherein said one includes at least one clamping block, firmly pinching the resilient band before the ends thereof so as to retain the resilient band in position.

16. A mount as described in claim 9 wherein said resilient means comprises at least one resilient band having two ends, the band being symmetrically disposed about said support tube and extending from one of said bracket and the upper end of said frame and lengthwise slidable over the other one and back to said one, and wherein said one includes at least one clamping block, firmly pinching the resilient band before the ends thereof so as to retain the resilient band in position.

17. A mount as described in claim 2 wherein the upper end of said frame comprises an upper block to which an upper end of each of said guides is attached, the upper block being rotatable about said support tube so as to adjust the guides parallel therewith, the mount additionally comprising retaining means for releasably retaining the upper block in any of a plurality of angularly spaced positions.

18. A mount as described in claim 4 wherein the upper end of said frame comprises an upper block to which an upper end of each of said guides is attached, the upper block being rotatable about said support tube so as to adjust the guides parallel therewith, the mount additionally comprising retaining means for releasable retaining the upper block in any of a plurality of angularly spaced positions.

19. A mount as described in claim 18 wherein said retaining means comprises:
   (a) a housing fixedly connected to the lower end of said frame and extending therefrom to the upper end of said frame, the housing having a transversely extending slot in an upper end thereof;
   (b) a bolt passing through the slot in the housing and into the upper block, so that the bolt can be releasably tightened with a head thereof pressing against the housing to retain the upper block in any of the angularly spaced positions.

20. A mount as described in claim 7 wherein said retaining means comprises:
   (a) a housing fixedly connected to the lower end of said frame and extending therefrom to the upper end of said frame, the housing having a transversely extending slot in an upper end thereof;
   (b) a bolt passing through the slot in the housing and into the upper block, so that the bolt can be releasably tightened with a head thereof pressing against the housing to retain the upper block in any of the angularly spaced positions.

21. A mount as described in claim 9 wherein said retaining means comprises:
   (a) a housing fixedly connected to the lower end of said frame and extending therefrom to the upper end of said frame, the housing having a transversely extending slot in an upper end thereof;
   (b) a bolt passing through the slot in the housing and into the upper block, so that the bolt can be releasably tightened with a head thereof pressing against the housing to retain the upper block in any of the angularly spaced positions.

22. A mount as described in claim 1 additionally comprising:
   (a) a first serated disc connected to said frame;
   (b) a second serated disc rotatably mounted adjacent said first serated disc so as to mesh therewith when pressed thereagainst;
   (c) tensioning means moveable between a tightened and a released position, for releasably pressing said second disc against said first disc when tightened, and allowing said second disc to rotate with respect to said first disc when released;
   (d) a pan handle connected to said second disc; said first and second discs being disposed such that said pan handle can swing in a vertical plane when said tensioning means is released, and can be fixed in any of a plurality of positions in the vertical plane when said tensioning means is released.

23. A mount as described in claim 8 additionally comprising:
   (a) a first serated disc connected to said frame;
   (b) a second serated disc rotatably mounted adjacent said first serated disc so as to mesh therewith when pressed thereagainst;
   (c) tensioning means moveable between a tightened and a released position, for releasably pressing said second disc against said first disc when tightened, and allowing said second disc to rotate with respect to said first disc when released;
   (d) a pan handle connected to said second disc;
   said first and second discs being disposed such that said pan handle can swing in a vertical plane when said tensioning means is released, and is fixed in any of a plurality of positions in the vertical plane when said tensioning means is released.

* * * * *